United States Patent [19]
Armstrong

[11] 3,749,879
[45] July 31, 1973

[54] APPARATUS FOR PROVIDING CONTROLLED TEMPERATURE AMBIENT

[75] Inventor: James J. Armstrong, East Providence, R.I.

[73] Assignee: Texas Instruments, Incorporated, Dallas, Tex.

[22] Filed: Dec. 27, 1971

[21] Appl. No.: 211,901

[52] U.S. Cl............... 219/210, 219/505, 219/441, 310/8.9
[51] Int. Cl. .......................................... H05b 1/00
[58] Field of Search.................. 219/210, 420, 441, 219/504, 505, 521; 210/8.9, 9

[56] References Cited
UNITED STATES PATENTS

| | | | |
|---|---|---|---|
| 3,038,056 | 5/1962 | Wolfskill | 219/210 |
| 3,646,315 | 2/1972 | Marcoux | 219/210 |
| 3,414,704 | 12/1968 | Flanagan | 219/210 |
| 3,414,705 | 12/1968 | Marcoux | 219/210 |
| 3,414,706 | 12/1968 | Flanagan et al. | 219/210 |
| 3,437,790 | 4/1969 | Marcoux | 219/210 |
| 3,400,250 | 9/1968 | Buiting et al. | 219/505 X |
| 3,487,238 | 12/1969 | Angleton et al. | 310/8.9 X |

*Primary Examiner*—Volodymyr Y. Mayewsky
*Attorney*—Harold Levine et al.

[57] ABSTRACT

Apparatus is disclosed fo providing a controlled temperature ambient for temperature sensitive devices comprising an electrically and thermally insulative housing in which is mounted one within the other, first and second heat transfer members spaced from each other and from the housing. The heat transfer members sandwich therebetween self-regulating heating elements and serve as electrical terminals for the heating elements, the inner member being adapted to receive a temperature sensitive device therein.

10 Claims, 5 Drawing Figures

PATENTED JUL 31 1973

INVENTOR.
James J. Armstrong
BY
John C. Haug
Att'y.

APPARATUS FOR PROVIDING CONTROLLED TEMPERATURE AMBIENT

This invention relates to heating apparatus and more particularly to apparatus for providing a constant ambient temperature for temperature sensitive devices.

There are many devices, when used for certain purposes, which must be maintained at a predetermined temperature in order to obtain predictable operational characteristics in the output of such devices. Examples include crystals, transistors, diodes and various other electrical or electronic components.

Controlled or constant temperature ovens for maintaining these temperature sensitive devices at a constant temperature are well known. One known type employs an electric heater and thermostat combination. The thermostat keeps the temperature of the oven within a certain range by turning on and off the heater current by use of standard movable contacts. This type of oven has certain inherent disadvantages such as variance of temperature due to the temperature differential of the thermostat, that is the temperature of the oven cycles between two limits. Thus the control inherently has thermal overshoot, electrical noise as well as limited longevity of the device due to the mechanical movement involved.

One type of oven which is very effective makes use of a proportional type of control. In this type relatively complex electrical circuitry serve to limit the power input to the heater to equalize the heat loss from the oven. This is done, for example, by providing a bridge containing a temperature sensing device which is used to balance a circuit containing the heater. This type of control eliminates the on/off moving contacts and therefore provides more precise control with no overshoot or thermal cycling, more constant power requirement and no noise due to mechanical operation although many devices of this description do emit electrical noise. However, the major limitation in this type of oven is its high cost due to its relatively complex circuitry which makes it uneconomical to use for many applications.

A type of oven which avoids the above mentioned disadvantages is that which uses a self-regulating heating element as set forth, for example, in U.S. Pat. Nos. 3,414,704 to Charles D. Flanagan and 3,414,705 to Leo Marcoux, both assigned to the assignee of the instant invention. In this type of oven, material having a steeply sloped positive temperature coefficient (PTC) of resistivity such as a doped barium titanate is employed. The PTC material in the form of electrical resistance elements act not only as a heater but also as their own temperature regulator. The elements have a low resistance in the cold state and when power is applied through the heating circuit relatively large current is drawn causing the element to heat up until its temperature increases above an anomaly point when its resistance suddenly increases by several orders of magnitude thereby decreasing the current and concomitant heat generation. Continued operation results in heat generation just offsetting heat loss from the oven.

An even more efficient oven is disclosed in copending and coassigned application, Ser. No. 692,004 which issued on Feb. 29, 1972 as U.S. Pat. No. 3,646,315. In that application, apparatus is described and claimed comprising an inner oven, in which temperature sensitive devices are mounted, placed within an outer oven. Both ovens contain one or more PTC heating elements with the heating element in the outer oven having a lower anomaly temperature than that in the inner oven. A first relatively constant ambient is obtained in the outer oven in which the inner oven is located which enables the inner oven to act more efficiently in maintaining a relatively constant ambient for the temperature sensitive devices. The outer oven tends to act as a buffer for the inner oven.

Briefly, the present invention is directed to an oven which exhibits a double oven characteristics but is even simpler in construction and less expensive to manufacture than that referenced above. The oven comprises, mounted one within the other within a housing in spaced relation to each other and to the housing, first and second heat transfer members sandwiching therebetween one or more PTC elements. The inner heat transfer member seats the temperature sensitive device whose temperature is to be regulated. A temperature gradient exists across the elements so that the two heat transfer members are maintained at different temperature, the outer member acting as a buffer for the inner member.

It is therefore an object of the invention to provide an oven which is simple, highly reliable, long lasting, mechanically and electrically silent operating, one which displays a closely controlled, relatively constant ambient or oven temperature.

It is an object of the invention to provide an improved oven whose temperature is self-regulating and exhibits double oven characteristics.

Another object of the invention is the provision of an oven which will maintain a relatively constant inside temperature for temperature sensitive devices contained therein regardless of changes in heat demand or changes in outside ambient conditions which is simple, reliable, inexpensive to produce, long lasting, silent in operation and having no moving parts.

The invention accordingly comprises the elements and combinations of elements, features of construction and manipulation and arrangement of parts, all of which will be exemplified in the structure hereinafter described, and the scope of the application of which will be indicated in the appended claims.

In the accompanying drawings in which one of the various possible embodiments of the invention is illustrated:

Similar reference characters indicate corresponding parts throughout the views of the drawings.

Figure 1:
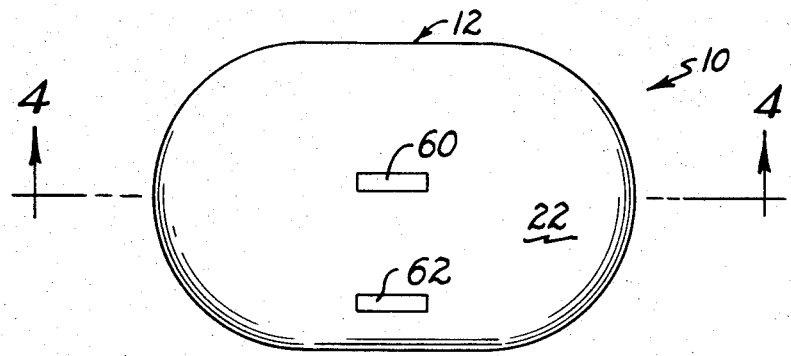
FIG. 1 is a front view of an oven made in accordance with the invention.
Figure 2:
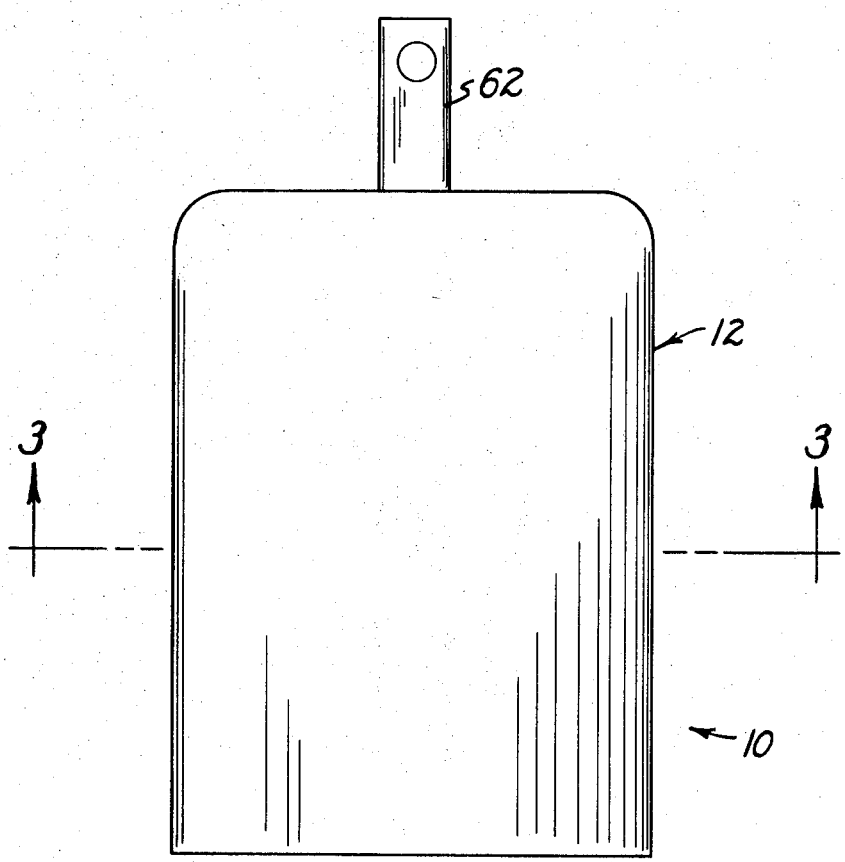
FIG. 2 is a top view of the FIG. 1 oven.

Dimensions of certain of the parts as shown in the drawings may have been modified or exaggerated for the purpose of clarity of illustration.

Figure 3:
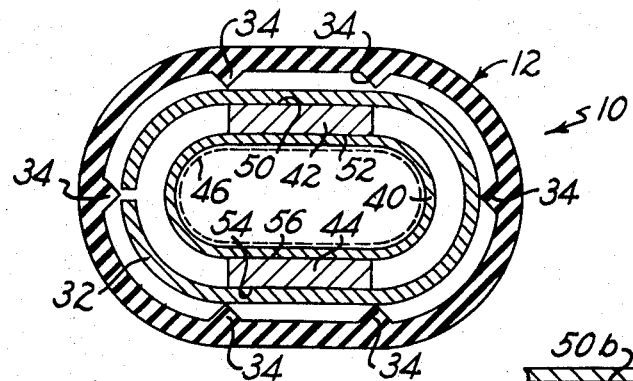
FIG. 3 is a cross sectional view taken on lines 3—3 of FIG. 1.
Figure 3A:
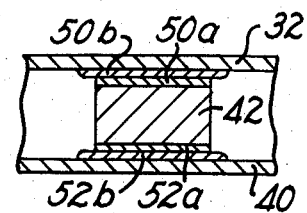
FIG. 3a is an enlarged portion of FIG. 3.
Figure 4:
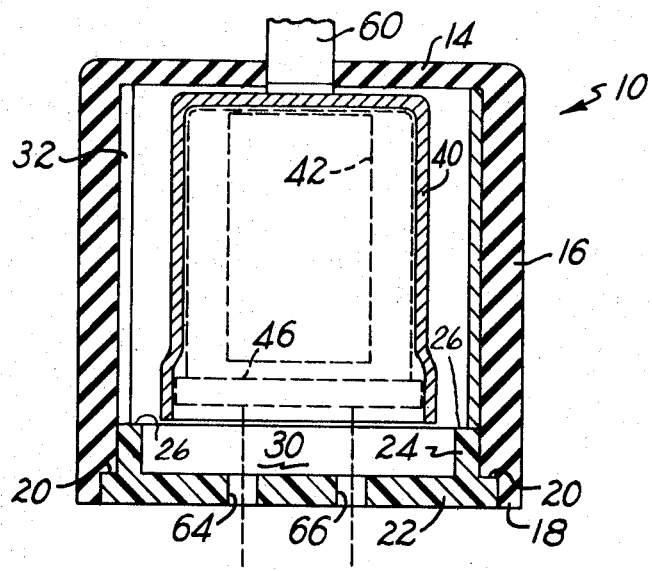
FIG. 4 is a cross sectional view taken on lines 4—4 of FIG. 2.

Referring now to the drawings, oven 10 comprises an outer housing including a cup-shaped member 12 of thermally and electrically insulative material such as a phenolic resin. Member 12 is shown to be ellipitcal in top view but could be of any convenient configuration, such as circular, rectangular, etc. It is formed with a first closed end 14, a depending wall 16 and second open end 18. A flange 20 is formed in the free distal end portion of wall 16 and receives a mating cover member 22, also of thermally and electrically insulative material which can conveniently be of the same material as cup-shaped member 12. Skirt 24 depends from cover 22 and fits closely within wall 16, the distal end 26 serving as a stop element as will be explained in greater detail below. A cavity 30 is formed within the housing and receives therein a first heat transfer member in the form of a liner 32 which is formed of highly thermally conductive material, such as copper. Liner 32 is maintained in spaced apart relation from wall 16 by means of rib members 34 formed in wall 16 and running longitudinally along member 12. A second heat transfer member 40 also of highly thermally conductive material such as copper, is received within the envelope formed by liner 32 and serves as a component receiving case member. Sandwiched between first and second heat transfer members 32 and 40 are electrical resistor pills 42, 44. Pills 42, 44 are formed of steeply sloped positive temperature coefficient (PTC) of resistance material, such as ceramic type doped barium titanate, for example, $Ba_{.997}La_{.003}TiO_3$. In order for the oven to be self-regulating the PTC material must have a large positive temperature coefficient of resistance so that at temperatures above an anomaly point resistance of the pills will increase several orders of magnitude within a very narrow temperature range, for instance one degree centigrade. The anomaly point can be varied to suit the particular characteristics of the device whose temperature is to be controlled by using the appropriate material composition known in the art. For instance, for a crystal, as indicated by phantom lines 46, PTC pills having an anomaly point of 80°C. may be used having a composition of $BaSrTiO_3$. Pills 42, 44 have opposed parallel surfaces 50, 52 and 54, 56 respectively on which electrically conductive layers are coated, as by flame spraying of aluminum as set forth in copending, coassigned application Ser. No. 340 filed Jan. 2, 1970, which issued July 11, 1972 as U.S. Pat. No. 3,676,211. Heat transfer members 32 and 40 may conveniently serve as contact elements for the PTC pills and in order to insure not only electrical connection, but also a highly thermally conductive connection therewith, a conductive silver epoxy such as C-409 of Amicon Corporation, Lexington, Mass. may be employed. This is an epoxy containing 60–70 percent silver by weight. A thin layer is applied to the electrically conductive layers on flat surfaces 50, 52 of pill 42 and 54, 56 of pill 44 and then sandwiched between heat transfer members 32 and 40 and the epoxy allowed to cure as by subjecting to a heating step. FIG. 3a shows pill 42 with conductive layers 50a, 52a bonded to heat transfer members 32, 40 by epoxy material 50b, 52b respectively. Pill 44 is mounted in the same manner. Alternatively, pills 42, 44 may be thermally and electrically connected to heat transfer members 32, 40 by soldering techniques. For instance, a layer of copper could be coated on top of the aluminum layers and then a tin-lead solder could be employed to bond the pills to the heat transfer members. It is preferred to form liner 32 out of a strip of stock to enhance the physical connection between the pills and the respective heat transfer members. Both heat transfer members are preferably formed with opposed flat surfaces to receive the pills. Pills 42, 44 also serve to space the heat transfer members from each other to provide an air space therebetween. Attached in any convenient manner to heat transfer members 32 and 40 as by soldering to or by forming integrally from the members are respective terminals 60, 62 which extend through apertures in end wall 14. By so connecting pills 42, 44 to the first and second heat transfer members the pills are electrically connected in parallel circuit relation. Thus not only is means for applying voltage to the pills provided but also means to mechanically mount the heat transfer members within the housing. Apertures 64, 66 are provided in cover 22 to permit the leads of the temperature sensitive device to pass therethrough. Distal portion 26 of skirt 24 acts as a stop element and maintains liner 32 in position. After insertion of device 46 in the component receiving case 40, which fits closely therein, cover 22 may be permanently attached, if desired, to member 12 by any conventional means, as by using adhesive. Operation of the oven will now be described. First heat transfer member 32 forms the outer oven while second heat transfer member 40 forms the inner oven. Initially in the cooled, unenergized condition the resistance of pills 42, 44 is at a low base level. Application of voltage to terminals 60, 62 will cause a relatively high level of current to pass through pills 42, 44 generating heat and quickly raising their temperature above the anomaly point causing the resistance to rapidly increase several orders of magnitude, thereby decreasing current and heat generation ($I^2R$) until it just balances heat loss from the oven. The first and second heat transfer members are spaced from each other and from the housing to provide thermal insulation so that a temperature gradient exists with heat transfer member 40 maintained virtually at the anomaly temperature of the PTC pills and heat transfer member 32 at a slightly lower temperature. Heat loss from oven 10 is buffered by the outer oven or heat transfer member 32 which in effect provides ambient compensation. That is the inner oven operates within the ambient created by the outer oven, thereby increasing the overall gain. The thermal insulation between the inner and outer ovens provides the thermal isolation required for the double oven concept to work. The thermal insulation between the housing and the outer oven enables the PTC elements to dissipate less heat at low outside ambients which results in more stable temperature of the PTC pills.

Thus by means of the present invention an oven employing PTC heating elements provides a gain in performance 2 or 3:1 compared to the single PTC ovens set forth in U.S. Pat. Nos. 3,414,704 and 3,414,705 mentioned supra due to double oven effect even though only PTC elements having a single anomaly temperature are employed.

It is within the purview of the invention to employ either a single PTC pill or more than two such pills, if desired.

As many changes could be made in the above constructions without departure from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

I claim:

1. Apparatus for maintaining a relatively constant ambient temperature in an enclosure comprising:
   an outer housing of thermally insulative material formed with a cavity therein and having terminal apertures extending from outside the outer housing into the cavity;
   a first heat transfer member comprising a thermally conductive liner located in the cavity, the liner essentially enveloping a predetermined area;
   means mounting the liner in the outer housing and maintaining the liner in spaced relation therewith;
   a second heat transfer member comprising a thermally conductive component receiving case member positioned within the liner envelope;
   electrical resistor pill means sandwiched between the first and second heat transfer members, the pill means maintaining the first and second heat transfer members in spaced relation with each other and occupying less volume than the entire space therebetween; and
   means to apply a voltage to the electrical resistor means including terminals extending through the terminal apertures, the terminals providing electrical connection to the resistor pill means.

2. Apparatus according to claim 1 in which the electrical resistor pill means extends along only a portion of the facing surfaces of the liner and the case member in the direction of their peripheries.

3. Apparatus according to claim 1 in which the electrical resistor pill means comprises material having a steeply sloped positive temperature coefficient of resistivity.

4. Apparatus according to claim 1 in which the case member is generally elliptical as seen in a top view and has a flat surface area and the liner has a flat surface area aligned with the flat surface area of the case member and the electrical resistor pill means comprises a pill having two parallel surfaces bonded to respective flat surface areas.

5. Apparatus according to claim 1 in which the case member has two flat surface areas disposed on opposite sides of the case, and the liner has two flat surface areas disposed on opposite sides of the liner in alignment with respective flat surface areas of the case member, and the electrical resistor pill means comprises two pills, each having two parallel surfaces, each surface bonded to a respective flat surface area.

6. Apparatus according to claim 5 in which the pills are electrically connected to the flat surface areas by electrically and thermally conductive epoxy material.

7. Apparatus according to claim 6 in which the pills comprise steeply-sloped positive temperature coefficient of resistivity material.

8. Apparatus according to claim 7 in which the material is a ceramic like material having a flame sprayed layer of aluminum on the parallel surfaces.

9. Apparatus for maintaining a relatively constant temperature in an enclosure comprising:
   an outer housing in the form of a cup-shaped member having a first closed end, a depending wall and a second open end, and a cover received in the open end to enclose a cavity within the housing, the cup-shaped member and the cover formed of electrically and thermally insulative material, and a plurality of ribs formed in the depending wall;
   an electrically and thermally conductive liner located in the cavity and spaced from the depending wall by the ribs, the liner having a terminal extending therefrom;
   an electrically and thermally conductive component receiving case member located within the liner and spaced therefrom, the case member having a terminal extending therefrom;
   electrical heating means comprising at least one pill of ceramic like material, the pill sandwiched between the liner and the case member;
   electrically and thermally conductive epoxy bonding the pill to the liner and the case member; and
   the housing defining apertures through which the terminals extend.

10. Apparatus according to claim 9 in which the pill is comprised of a doped barium titanate.

* * * * *